United States Patent [19]

Maw et al.

[11] Patent Number: 5,783,751

[45] Date of Patent: Jul. 21, 1998

[54] CUTTING FORCE SENSOR IN THE FORM OF A TURRET LOCKING SCREW

[75] Inventors: Hsieh Chi Maw, Miaoli; Spring C.-C. Hung; Chang-Ming Chen, both of Hsinchu, all of Taiwan

[73] Assignee: Industrial Technology Research Institute, Hsinchu, Taiwan

[21] Appl. No.: 774,577

[22] Filed: Dec. 31, 1996

[51] Int. Cl.$^6$ ............................................. F16B 31/02
[52] U.S. Cl. ............................................. 73/761; 73/862.06
[58] Field of Search ............... 73/761, 767, 862.044, 73/862.045, 862.049, 862.06

[56] References Cited

U.S. PATENT DOCUMENTS

| | | | |
|---|---|---|---|
| 4,429,579 | 2/1984 | Wilhelm | 73/761 |
| 4,526,044 | 7/1985 | Mosar et al. | 73/862.06 |
| 4,553,124 | 11/1985 | Malicki | 73/761 |
| 4,674,339 | 6/1987 | Hatamura et al. | 73/862.044 |
| 4,875,356 | 10/1989 | Powell et al. | 73/104 |
| 4,924,713 | 5/1990 | Machino et al. | 73/862.06 |
| 5,211,060 | 5/1993 | Obrien et al. | 73/862.044 |

*Primary Examiner*—Richard Chilcot
*Assistant Examiner*—Max H. Noori
*Attorney, Agent, or Firm*—W. Wayne Liauh

[57] ABSTRACT

A cutting force sensor for measuring the variation of cutting force in a cutting machine includes a screw shape body to serve as a locking screw in a turret of the machine. The sensor has a pair of strain gauges at one end of the sensor to measure and detect the cutting force variations of a cutting tool held by the turret and send the signals to a pair of Wheatstone Bridges located at another end of the sensor. The signals are then filtered, amplified and analyzed for monitoring the cutting tool wear and/or breakage condition. The sensor is located close to the cutting point and therefore can generate high S/N (Signal/Noise) ratio and produces more precise measurements. The sensor is of low cost and does not take additional space and can be readily used in an existing machine without requiring expensive structural changes. The sensor also contains a slot opening with a predetermined dimension formed in the bottom portion so as to improve the sensitivity of the sensor without comprising its structural integrity.

6 Claims, 4 Drawing Sheets

CUTTING FORCE SENSOR IN THE FORM OF A TURRET LOCKING SCREW

THE BACKGROUND OF THE INVENTION

1. Field of the invention

This invention relates to a sensor of cutting force and particularly to a sensor for detecting the variation of cutting force of a cutting tool in a cutting machine.

2. Description of the prior art

Automation is a widely pursued trend in the manufacturing industry nowadays. Under such circumstance, various types of machine centers, automatic single function machines, CNC lathes and multi-function machineries have been employed extensively. In order to improve the cutting quality, to enhance efficiency and to reduce down time, most modern cutting machineries are furnished with a cutting force sensor (e.g. transducer) to monitor and detect abnormal cutting process or cutting tool breakage.

U.S. Pat. No. 4,875,365, No. 4,924,713 and No. 5,211,060 have disclosed different kinds of sensors for use in automatic machinery. However they still have some drawbacks as follows:

(1) The sensor is generally located far away from the cutting point and thus the measuring sensitivity is reduced. For instance, U.S. Pat. No. 4,875,365 has the plate type sensor located under the locked turret; U.S. Pat. No. 4,924,713 has the ring type sensor attached to the outer portion of the bearing which supports the feed screw shaft; and U.S. Pat. No. 5,211,060 has the block type sensor placed on a cutting workpiece plate (i.e. the stationary blade assembly).

(2) The machine structure has to be changed to install the sensor. For example, U.S. Pat. No. 4,875,365 has to change the locked turret height and the related mechanism to accommodate the plate type sensor; U.S. Pat. No. 4,924,713 has to increase the bearing size of the machine spindle for installing the ring type sensor that will consequently greatly change the machine structure and increase the cost; and U.S. Pat. 5,211,061 has to change the cutting workpiece plate for installing the block type sensor. All of this will change the machine structure, increase the machine size and push up the costs.

SUMMARY OF THE INVENTION

In view of the aforesaid disadvantages, it is therefore an object of this invention to provide a sensor of cutting force that is compact and simple in structure, and can be readily adapted to existing machinery without requiring costly changes in machine structure.

The sensor according to this invention is generally formed like a screw and is to replace a conventional screw in the tool turret of the machine. The sensor has strain gauges and Wheatstone Bridges built therein for detecting the signal change resulting from the changes of cutting force or cutting tool crumbling. As the sensor location is close to the cutting point, the S/N (i.e. Signal/Noise) ratio is high. The measuring accuracy thus can be greatly enhanced. Furthermore, since the screw-like sensor is used to replace a conventional screw in the tool turret, there is no need to change the machine structure to accommodate the sensor.

BRIEF DESCRIPTION OF THE DRAWINGS

The invention, as well as its many advantages, may be further understood by the following detailed description and drawings in which.

DETAILED DESCRIPTION

Figure 1:
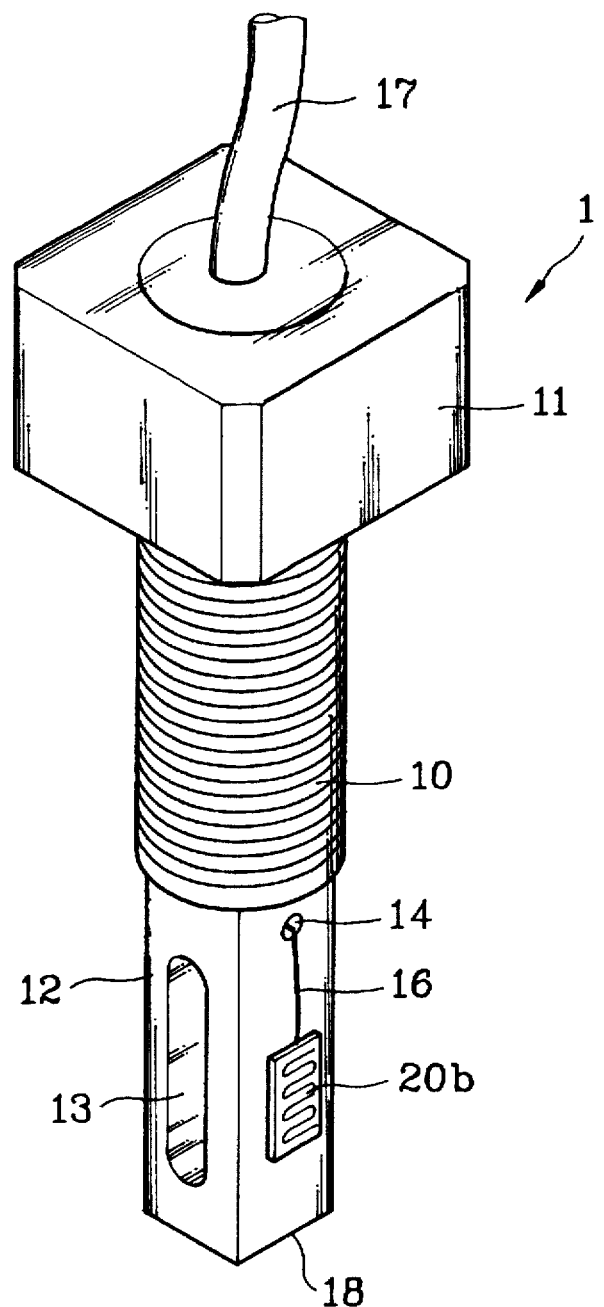
FIG. 1, is a perspective view of this invention.
Figure 2:
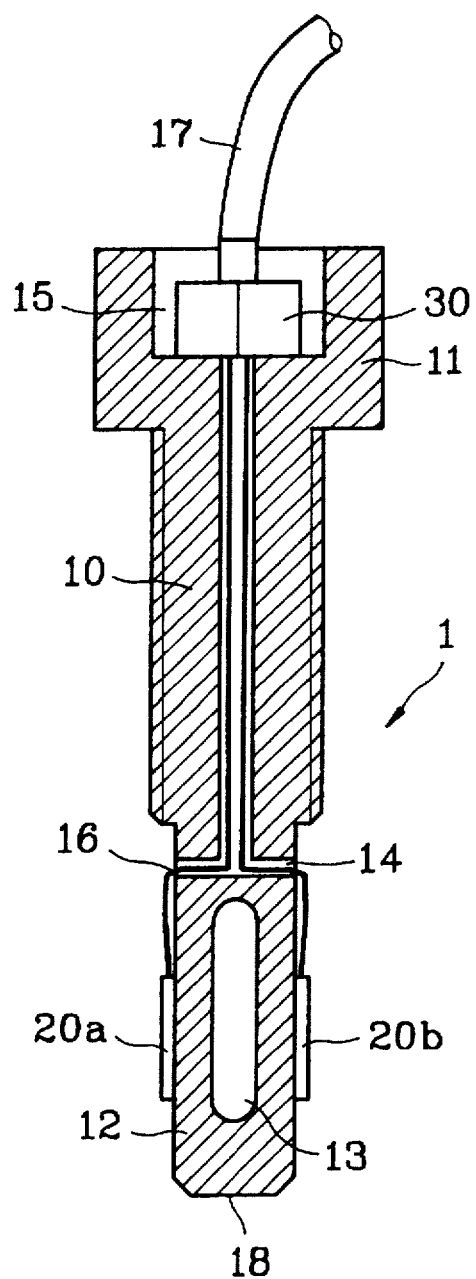
FIG. 2, is a sectional view of this invention.
Figure 3:
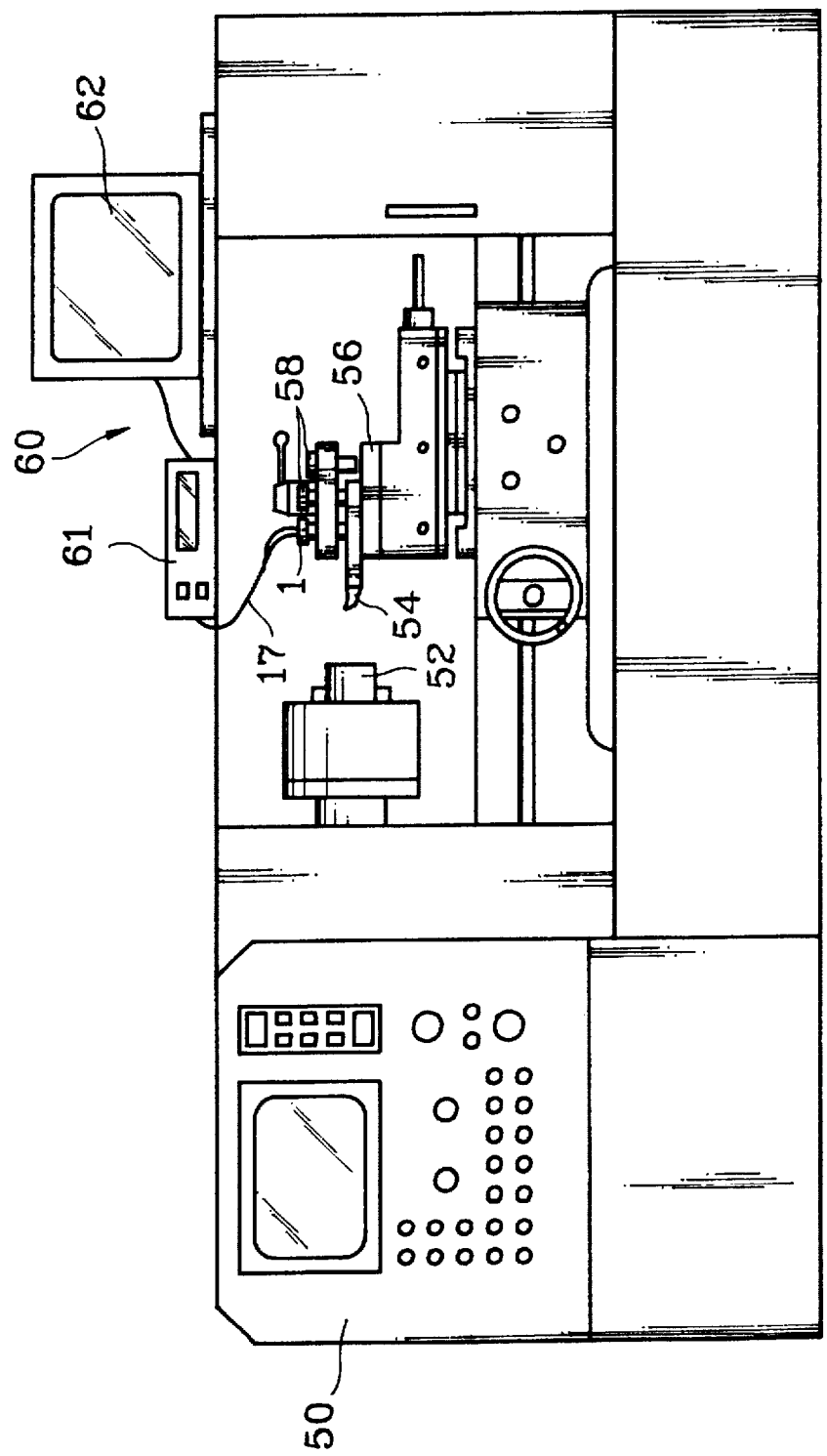
FIG. 3 is a side view of this invention being installed in a lathe.

Referring to FIGS. 1 and 2, the sensor 1 according to this invention includes a body 10 which is substantially shaped like a screw, a pair of strain gauges 20a and 20b, and a pair of Wheatstone Bridges 30. The profile and specification of the body 10 are conformed to a screw used in a turret for locking a cutting tool. Thus the sensor 1 can replace a turret screw 58 and be installed in a turret 56 (as shown in FIG. 3). In the preferred embodiment, the sensor 1 is used to replace the screw 58 which is located nearest to the cutting point. The sensor 1 has a square head 11 on the top above the body 10 for facilitating the sensor 1 to be screwed into or out of a screw hole in the turret 56. The tail section of the sensor 1 below the body 10 is formed into a rectangular strut 12 with a through transverse hole 14 running through one pair of opposite surfaces and a slot type opening 13 running through another pair of opposite surfaces. The square head 11 has an axial counterbore 15. There is a center passage communicating between the counterbore 15 and the transverse hole 14 to form an inverse T-shape channel. On the two surfaces of the strut 12 below the transverse hole 14, there are attached respectively a pair of strain gauges 20a and 20b which are wired by means of a signal wire 16 through the inverse T-shape channel to a pair of Wheatstone Bridges 30 located in the counterbore 15. The Wheatstone Bridges 30 are further connected by a signal cable 17 through another end to a monitor means 60 (shown in FIG. 3).

Referring to FIGS. 1 and 3 when this invention is in use, the sensor 1 is to replace one of the screws 58 (typically is the one nearest to the cutting point) in the turret 56 of a machine 50 for holding a cutting tool 54. The bottom end 18 of the strut 12 of the sensor 1 presses against the cutting tool 54. Therefore, during machining a work piece 52, the variation of cutting force on the cutting tool 54 is transmitted constantly to the bottom end 18 of the strut 12. The strain gauges 20a and 20b pick up the strain variations and convert them into voltage signals and transmit the signals through the signal wire 16 to the Wheatstone Bridges 30. Wheatstone Bridges 30 amplify the signals and transmit them via signal cable 17 to the monitor means 60. Monitor means 60 includes a signal amplifier 61 and a computer 62 which perform signal filtering and amplifying, and the following on processes of analysis, recording, reporting and display of the strain variation data.

Through the aforesaid structure, any abnormal cutting force variation caused by cutting tool wearing or breakage can be monitored instantly by the computer which will trigger an alarm to alert an operator to take remedial action. The faulty machining process can be either stopped or a problematic cutting tool 54 can be replaced. Therefore defective machine work can be prevented or reduced. In this manner, machining efficiency and operator productivity can be increased. The service life of the cutting tool can be improved while the machine down time can be reduced.

In order to enable the strut 12 to improve its sensitivity to the strain variation so that the strain gauges 20a and 20b can detect the voltage change more accurately, the slot type opening 13 is formed in the strut 12 to make the effective sectional area of the strut 12 smaller. The dimension of the opening 13 is dependent on the magnitude of the cutting force and should not impair the toughness of the body 10.

Applicant has employed Finite Element Analysis to do stress analysis for the strut 12, including the factors of material properties, fatigue life and safety factor, and has reached the following conclusion:

For a standard turret screw sized M10 used in the turret 56 with the threads portion length of 40 mm in the body 10, and with the strut 12 having a length of 20 mm, width 6.0–6.3 mm, opening 13 having a length 4–8 mm (preferably 6 mm), width 2.0–2.4 mm (preferably 2.2 mm), the resulting sensitivity of the strut 12 to detect strain variation (i.e. by strain gauges 20a and 20b) will be most desirable. Furthermore the body 10 can sustain forces (cutting force and screwing force) over 500 Kg with satisfactory safety and applicability.

Figure 4:
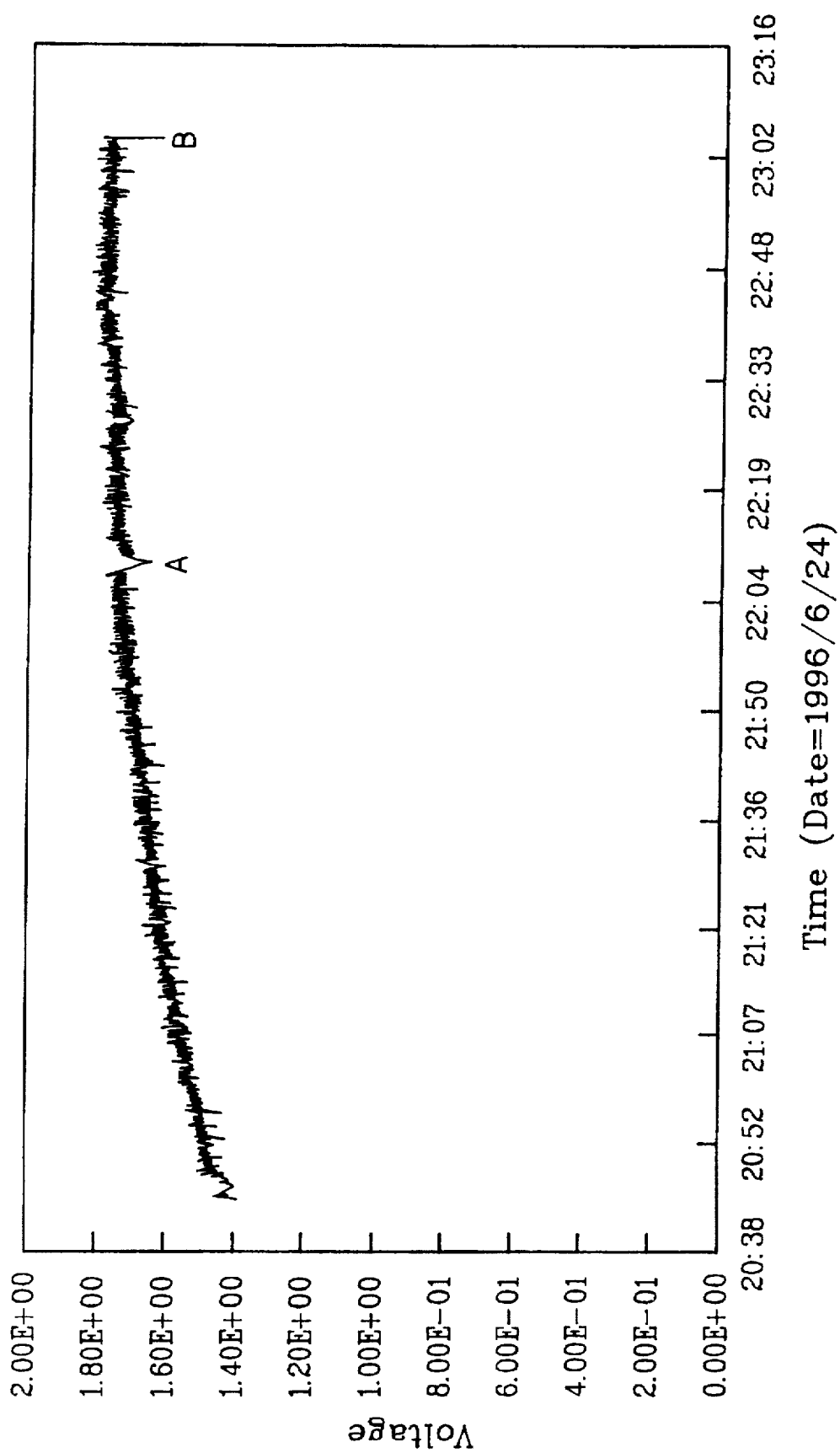
FIG. 4 is a testing results of this invention installed in an automatic single function machine for bearing ring.

FIG. 4 illustrates the testing results of this invention installed in an automatic single function machine for cutting the outer ring of a bearing. Every dot in the chart represents a maximum cutting force during cutting one work piece's process. The maximum cutting force (represented by measuring voltage) increased with time because of the wearing and blunting of the cutting tool. When reaching point A, the monitor means 60 detected that the cutting force drops significantly because of the cutting tool has been worn to an abnormal degree. The machine is stopped and a yellow light is flashed to alert the operator to make the necessary adjustment of the cutting tool. Then machining operation is resumed until reaching point B where the monitor means 60 detected that the cutting force drops sharply. The machine is stopped and a red light is on to alarm the operator that a cutting tool breakage could be happened. Then the operator can promptly replace a new cutting tool to resume the machining operation.

What have been set forth above is merely one of the possible embodiments of this invention, and does not intend to limit the scope or applicability of this invention. For instances, this invention can be applied to other machinery such as CNC lathes and multi-function machines equally well. Moreover this invention may be served as a locking screw used in a die for a press or stamping machine, or as a locking screw used in jig and feature for milling machine, drilling machine, etc.

This invention has many advantages over what have been disclosed in the prior arts. It is closely positioned beside the cutting tool, therefore has a higher sensitivity to monitor the variation of cutting force, and can also measure and detect the variation more precisely. The S/N (i.e. Signa/Noise) ratio is much higher. It takes the size of a conventional locking screw and therefore can be readily used in an existing machine without costly structural changes otherwise needed.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A cutting force sensor for a turret in a cutting machine wherein the turret is fixed to the cutting machine via a plurality of turret locking screws, comprising:

a body in a substantially bolt shape including a substantially rectangular strut at one very end near the bottom having a through transverse hole formed therein, and a square head at another end having an axial counterbore formed therein communicating with said transverse hole so as to form a T-shaped channel therein;

a pair of strain gauges attached respectively on two opposite surfaces of the strut below the transverse hole;

two Wheatstone Bridges located in the counterbore connecting at one end via a signal wire with the strain gauges in the T-shaped channel and at another end with a signal cable extending outside of the sensor; and a slot opening having a predetermined dimension formed in the said rectangular strut below the transverse hole toward the very end and across two opposite surfaces where no strain gauges are mounted;

wherein said body is shaped in the form similar to one of the locking screws locking the turret to the cutting machine so as to be able to replace one of the locking screws.

2. A cutting force sensor for a turret in a cutting machine wherein the turret is fixed to the cutting machine via a plurality of turret locking screws, comprising:

a body in a substantially screw shape including a substantially rectangular strut at one end having a through transverse hole formed therein, and a square head at another end having an axial counterbore formed therein communicating with said transverse hole so as to form a T-shaped channel therein;

a pair of strain gauges attached respectively on two opposite surfaces of the strut below the transverse hole;

a slot opening having a predetermined dimension formed in the said rectangular strut below the transverse hole toward the very end and across two opposite surfaces where no strain gauges are mounted;

wherein said body is shaped in the form similar to one of the locking screws locking the turret to the cutting machine so as to be able to replace one of the locking screws.

3. A cutting force sensor of claim 1, wherein the slot opening has a length in the range of 4–8 mm and a width in the range of 2–2.4 mm.

4. A cutting force sensor of claim 1, wherein the signal cable connects with a monitor means including a signal amplifier and a computer.

5. A cutting force sensor of claim 1, wherein the cutting machine is a single function cutting machine, a CNC lathe or a multi-function cutting machine.

6. A cutting force sensor of claim 1, wherein the cutting machine is a press, a stamping machine, a milling machine or a drilling machine.

* * * * *